US007380073B2

(12) United States Patent
Shorb

(10) Patent No.: US 7,380,073 B2
(45) Date of Patent: May 27, 2008

(54) COMPUTER-IMPLEMENTED SYSTEM AND METHOD FOR LOCK HANDLING

(75) Inventor: Charles S. Shorb, Cary, NC (US)

(73) Assignee: SAS Institute Inc., Cary, NC (US)

( * ) Notice: Subject to any disclaimer, the term of this patent is extended or adjusted under 35 U.S.C. 154(b) by 447 days.

(21) Appl. No.: 10/722,761

(22) Filed: Nov. 26, 2003

(65) Prior Publication Data

US 2005/0114609 A1    May 26, 2005

(51) Int. Cl.
  *G06F 12/00* (2006.01)
(52) U.S. Cl. .................................................... 711/152
(58) Field of Classification Search ................ 711/152, 711/150
  See application file for complete search history.

(56) References Cited

U.S. PATENT DOCUMENTS

| | | | | |
|---|---|---|---|---|
| 4,604,694 | A | | 8/1986 | Hough |
| 5,860,159 | A | | 1/1999 | Hagersten |
| 5,933,825 | A | * | 8/1999 | McClaughry et al. .......... 707/8 |
| 6,016,490 | A | * | 1/2000 | Watanabe et al. .............. 707/8 |
| 6,029,190 | A | * | 2/2000 | Oliver ......................... 718/107 |
| 6,112,222 | A | | 8/2000 | Govindaraju et al. |
| 6,247,025 | B1 | * | 6/2001 | Bacon ......................... 707/206 |
| 6,343,339 | B1 | * | 1/2002 | Daynes ....................... 710/200 |
| 6,480,918 | B1 | * | 11/2002 | McKenney et al. ......... 710/200 |
| 6,546,443 | B1 | * | 4/2003 | Kakivaya et al. ........... 710/200 |
| 6,598,068 | B1 | * | 7/2003 | Clark .......................... 718/104 |
| 6,691,194 | B1 | * | 2/2004 | Ofer ............................ 710/200 |
| 6,718,448 | B1 | * | 4/2004 | Ofer ............................ 711/163 |
| 6,883,026 | B1 | * | 4/2005 | Onodera et al. ............. 709/223 |
| 2003/0126187 | A1 | * | 7/2003 | Won et al. ................... 709/107 |
| 2003/0200398 | A1 | * | 10/2003 | Harris ......................... 711/152 |
| 2003/0233393 | A1 | * | 12/2003 | Li ............................... 709/107 |
| 2004/0059733 | A1 | * | 3/2004 | Li ................................. 707/8 |
| 2004/0117531 | A1 | * | 6/2004 | McKenney ................. 710/200 |

OTHER PUBLICATIONS

Butenhof, David R., "Programming with POSIX Threads", Addison-Wesley Professional Computing Series, Chapter 7, Oct. 1997, pp. 241-269.
Deitel, Harvey M., "An Introduction to Operating Systems", Chapter 5, Feb. 1990, pp. 112-151.
Schimmel, Curt, "UNIX® Systems for Modem Architectures:Symmetric Multiprocessing and Caching for Kernel Programmers", Addison-Wesley Publishing Company, pp. 154-169, Jun. 15, 1994.
Stallings, William Ph.D., "Operating Systems: Internals and Design Principles", 4th Edition, Prentice Hall, pp. 212-216, 2001.

* cited by examiner

*Primary Examiner*—Matthew Kim
*Assistant Examiner*—Sheng-Jen Tsai
(74) *Attorney, Agent, or Firm*—Jones Day

(57) ABSTRACT

Computer-implemented systems and methods for handling access to one or more resources. Executable entities that are running substantially concurrently provide access requests to an operating system (OS). One or more traps of the OS are avoided to improve resource accessing performance through use of information stored in a shared locking mechanism. The shared locking mechanism indicates the overall state of the locking process, such as the number of processes waiting to retrieve data from a resource and/or whether a writer process is waiting to access the resource.

43 Claims, 13 Drawing Sheets

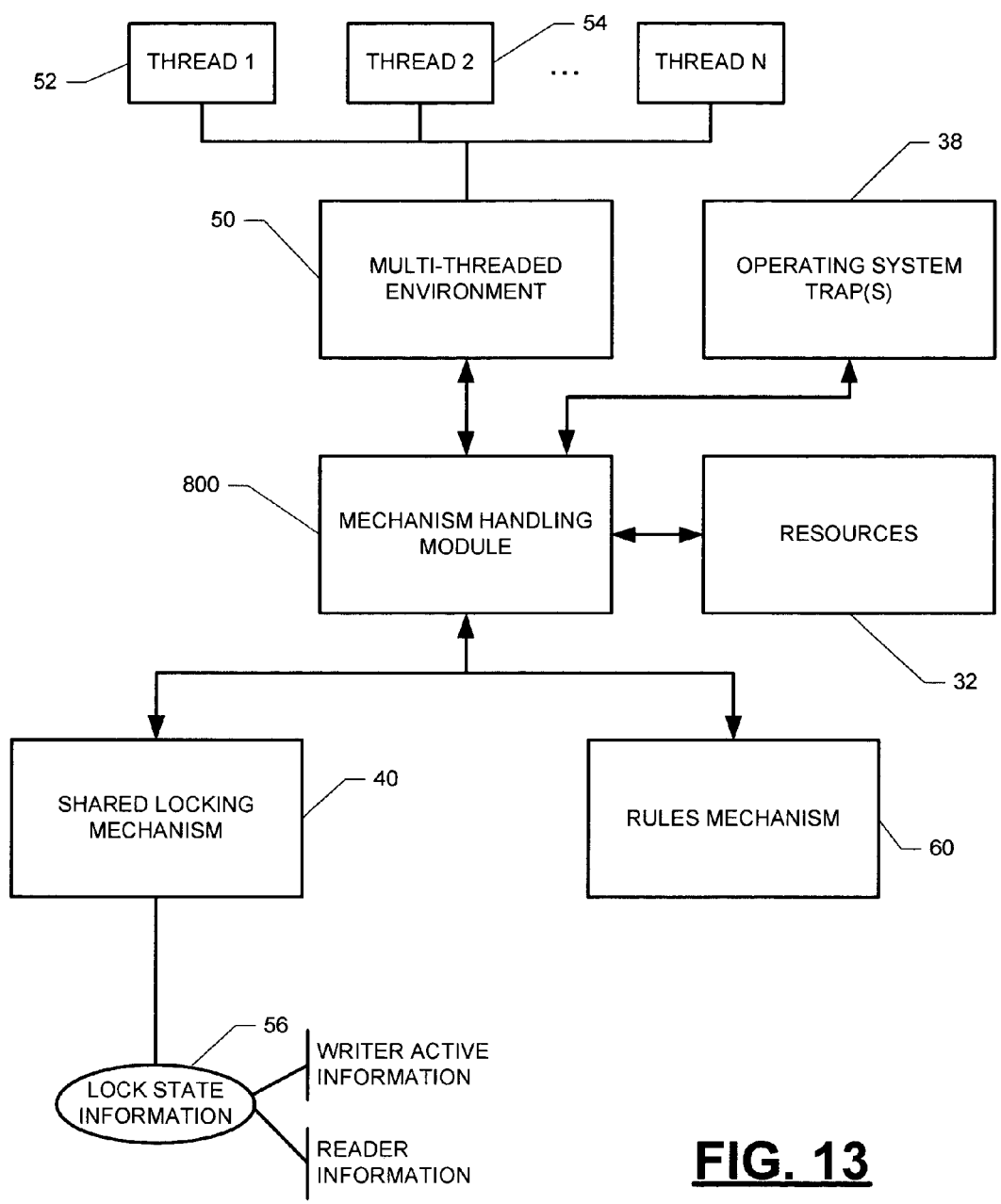

COMPUTER-IMPLEMENTED SYSTEM AND METHOD FOR LOCK HANDLING

TECHNICAL FIELD

The present invention relates generally to computer-implemented accessing of resources and more particularly to lock handling in the accessing of resources.

BACKGROUND

In multi-threaded environments, threads compete against each other for resources. The resources which the threads wish to access may include a file, an I/O device, data stored in memory, etc. Current approaches to handling the accessing of resources tend to exhibit performance inefficiencies. For example, one approach includes using a mutex (mutual exclusion) algorithm for synchronizing multiple threads read and write access to shared resources. Once a mutex has been locked by a thread, other threads attempting to lock it will be blocked. When the locking thread unlocks (releases) the mutex, one of the blocked threads will acquire it and proceed. (See *Programming with POSIX Threads*, David R. Butenhof, Addison Wesley Longman, Inc., Copyright 1997, pages 241-253).

Another example involves use of a native operating system lock to protect the underlying lock data structure elements (See *Programming with POSIX Threads*, David R. Butenhof, pages 253-269). This approach uses a read and write wait queue to block waiting requests until it is safe to service the requests. Obtaining exclusive access to the internal data structure of the shared lock by first obtaining an exclusive lock is computationally expensive and thus performance suffers.

SUMMARY

In accordance with the disclosure provided herein, systems and methods are provided for handling access to one or more resources. Executable entities that are running substantially concurrently provide access requests to an operating system (OS). One or more traps of the OS are avoided through use of lock state information stored in a shared locking mechanism. The shared locking mechanism indicates the overall state of the locking process, such as the number of processes waiting to retrieve data from a resource and/or whether a writer process is waiting to access the resource.

BRIEF DESCRIPTION OF THE DRAWINGS

FIG. 13 is a block diagram depicting a different lock system configuration.

DETAILED DESCRIPTION

Figure 1:
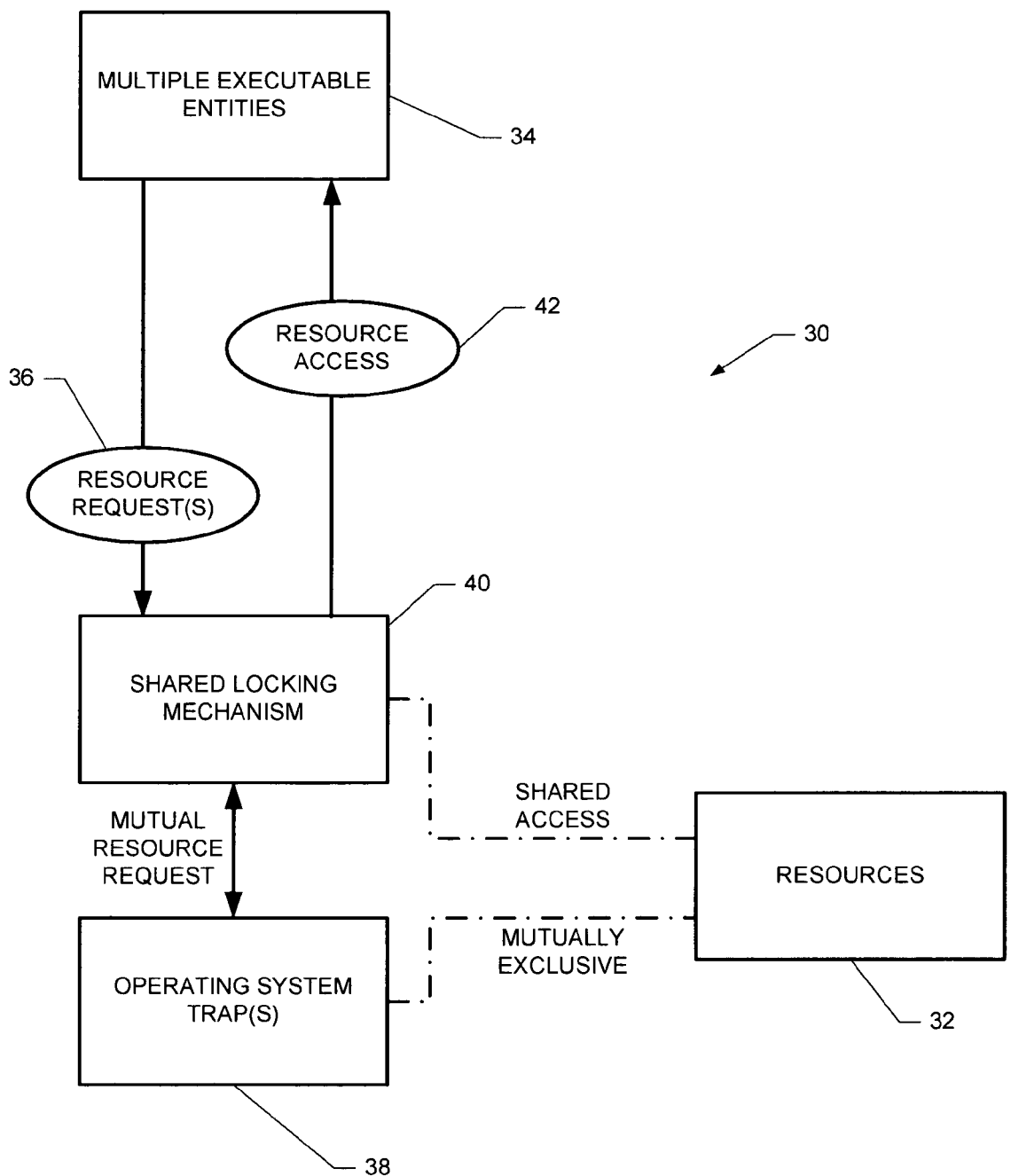
FIG. 1 is a block diagram depicting software and computer components utilized in lock management.

FIG. 1 depicts at 30 a computer-implemented system for handling access to one or more resources 32. Multiple concurrently running executable entities 34 (e.g., processes, threads, etc.) compete against each other to access the resources 32. The executable entities 34 provide access requests 36 to a shared locking mechanism 40. Access 42 to the resources 32 is handled based upon information stored in a shared locking mechanism 40.

The shared locking mechanism 40 details where in the locking process the system 30 is. For example, the shared locking mechanism 40 may indicate the number of executable entities waiting to retrieve data from a resource 32. The lock state information stored by the mechanism 40 may also include whether an executable entity 34 wishes to update data associated with a resource 32. The mechanism's lock state information indicates when it is proper to grant access to a resource 32 and, in some situations, what type of access is to be performed.

The locking state information stored in the shared locking mechanism 40 allows the opportunity for one or more traps 38 of the computer's operating system to be avoided when a resource is to be accessed. Avoided traps include those interrupts provided by the operating system's kernel that involve mutex algorithms or other costly locking approaches when accessing requested resources. The capability to avoid relatively intensive operating system (OS) kernel traps increases performance. It should be understood that the shared locking mechanism 40 may decide to utilize the OS traps 38, and may use in certain situations a mutually exclusive locking technique provided by the operating system in order to provide access 42 to a resource 32. Still further, the system 30 may be used so as to avoid all or substantially all OS calls when accessing resources through the shared locking mechanism 40.

There are many types of environments within which an execution entity 34 may use a shared locking mechanism 40 to request and access a resource 32. As an example, these include multi-processing, multi-tasking, and multi-threaded environments. An execution entity 34 can include processes, threads, daemons, applets, servlets, ActiveX components, stand-alone applications, code that runs at the request of another program, etc.

Figure 2:
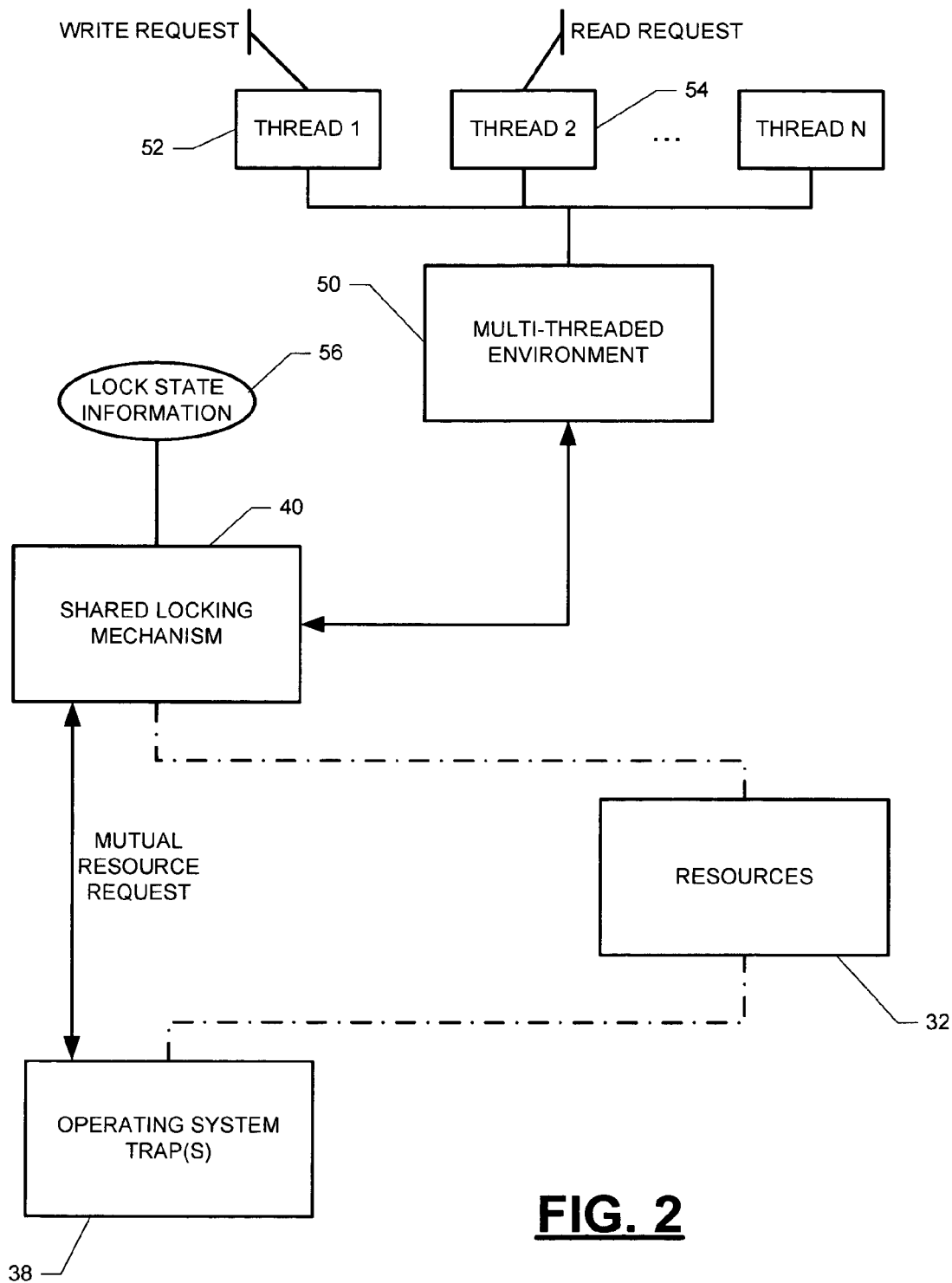
FIGS. 2 and 3 are block diagrams depicting software and computer components utilized in lock management for a multi-threaded environment.

FIG. 2 depicts a multi-threaded environment 50 where resources 32 require protection on a per thread basis. In this example, thread 1 (shown at 52) wishes to write to a resource 32, and thread 2 (shown at 54) wishes to read from a resource 32. Respectively from the threads (52, 54), a write request and a read request are routed to the shared locking mechanism 40. Due to knowledge of where in the locking process the system is, the shared locking mechanism 40 can minimize difficulties that may arise from the handling of the requests. As an illustration, the shared locking mechanism 40 may want, based upon the lock state information 56, to allow the read request and any others to succeed unless there is a write request active or pending. By examining the lock state information 56, the shared locking mechanism 40 can discern whether a resource write request is active or pending.

Figure 3:
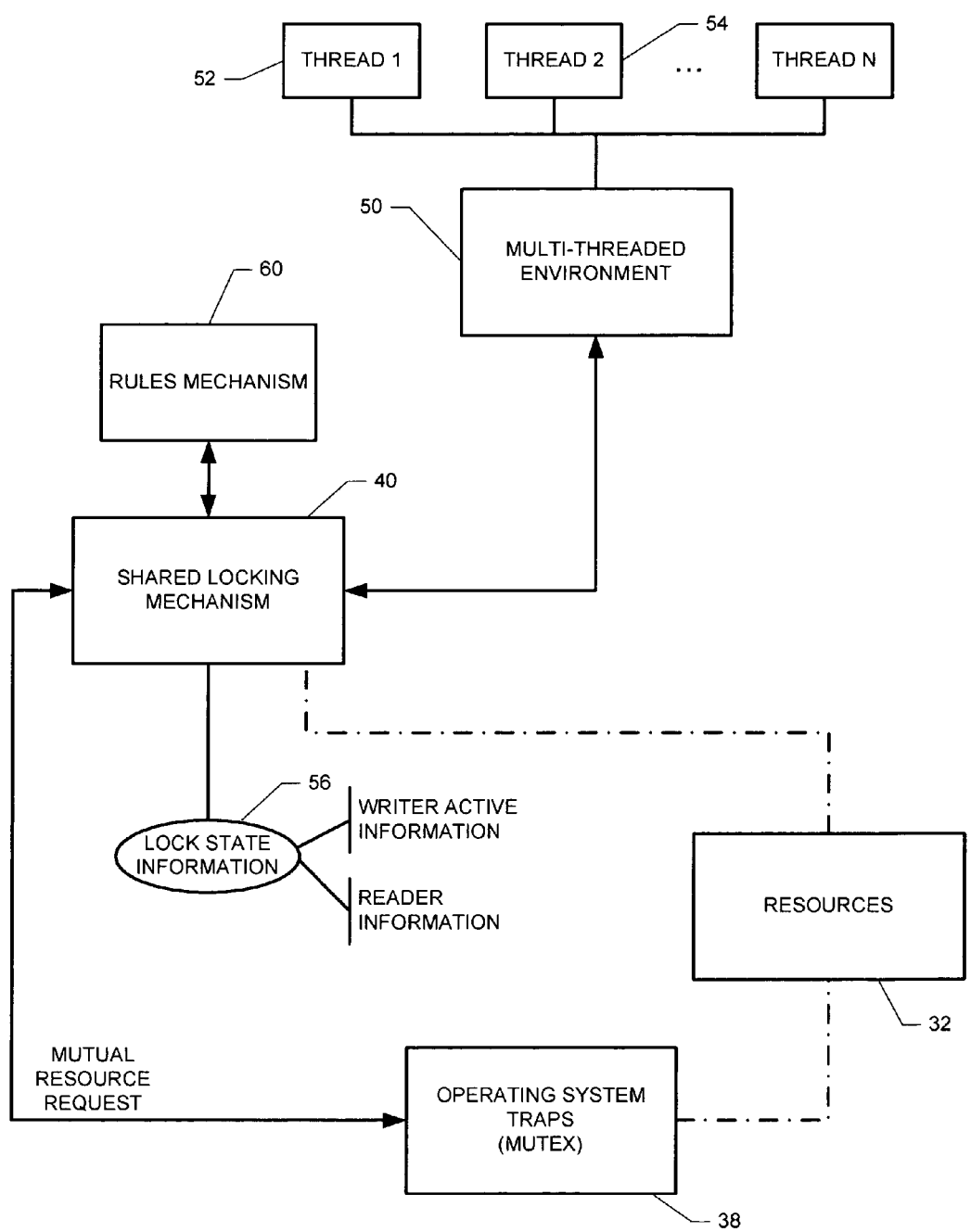

To assist a shared locking mechanism 40 in determining how to handle thread requests, the lock state information 56 may contain a wide variety of information. As an example, FIG. 3 shows that the lock state information 56 may include not only whether a write request is active but also information about any active or pending reader threads.

The shared locking mechanism 40 could use the lock state information 56 in combination with a rules mechanism 60. The rules mechanism 60 provides guidance as to how access to the resources 32 should proceed based upon the lock state information 56. Additionally, the rules mechanism 60 may be formulated to enhance performance. As an illustration, obtaining exclusive access to the internal data structure of a shared lock by first obtaining an exclusive lock via OS traps 38 is typically computationally expensive. The rules mechanism 60 may offer an improvement in performance by providing the following locking guidelines when a request is being processed:

Any number of read requests succeed in accessing a resource without using an exclusive lock unless there is a writer active or pending.

Only one writer may be active at any given time.

It should be understood that many other different types of locking rules may be used, either as a replacement for the examples provided above or as an augmentation. For example, the rules may include the following: no preference is given when deciding which of the waiting read or write requests should be honored first. This rule allows fairness, such as eliminating starvation situations wherein read or write requests are processed with a higher priority with a result that they may in some situations not allow the other type of request to be timely processed (e.g., reader or writer starvation situations).

The lock state information 56 may be used to indicate when lock-related events are to be posted by one thread in order to notify another thread that its request can be serviced. For example, the lock state information 56 may contain status information as to whether a reader thread can post a lock release event to a writer thread. This prevents multiple reader threads from creating redundant posting of lock release events. It is noted that for a writer pending state a lock release event involves notification that a thread has completed its access of a resource. A lock ready event involves notification to a waiting writer thread that it can proceed.

Figure 4:
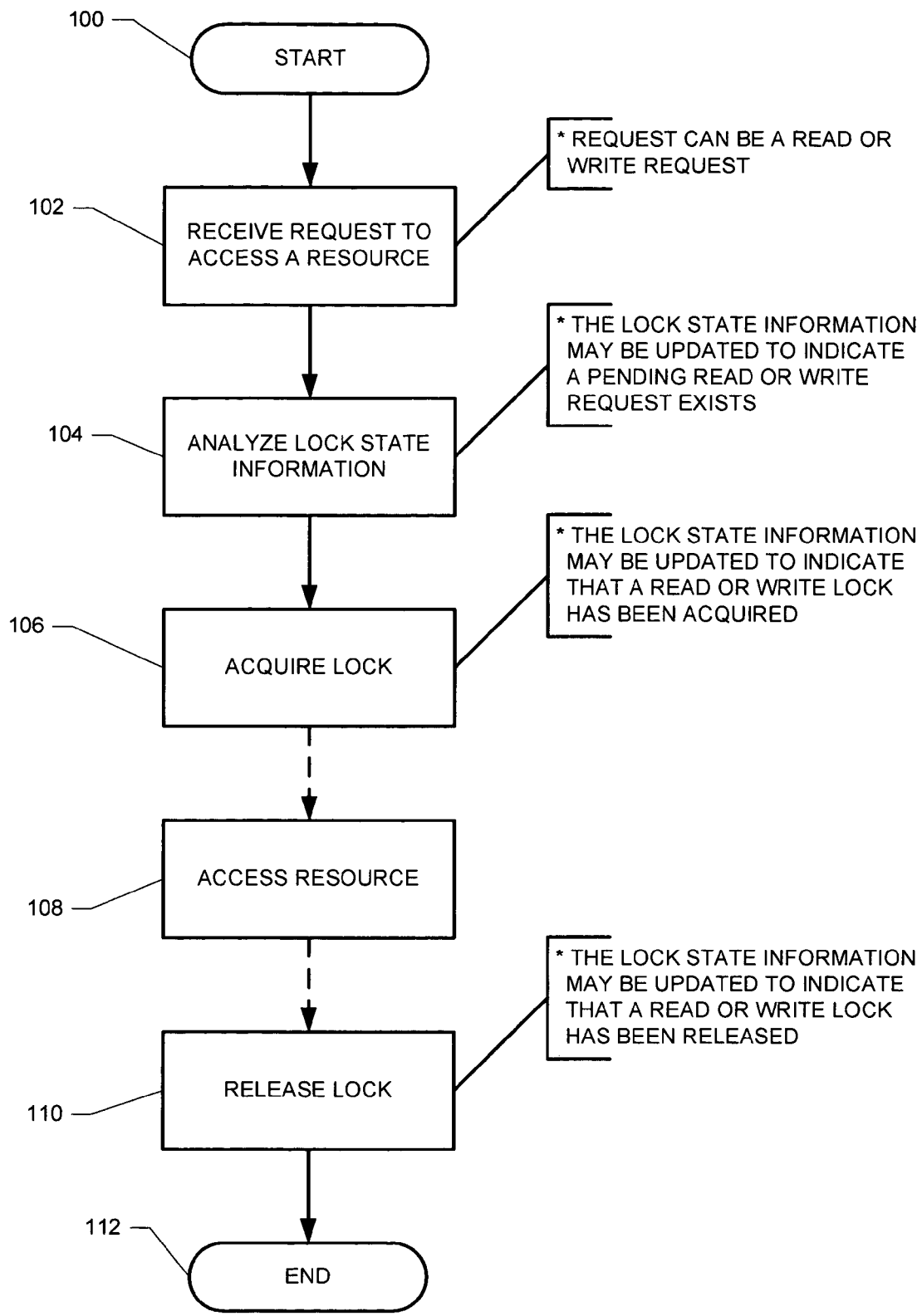
FIG. 4 is a flow chart depicting an operational locking scenario.

FIG. 4 is a flow chart depicting an operational locking scenario. Start indication block 100 indicates that a request to access a resource is received at step 102. The request may be a read or write request. In order to process the request, the lock state information is analyzed at step 104. The lock state information may be updated at this step to indicate a pending read or write request exists.

At step 106, the lock to the requested resource is acquired. The lock state information may be updated at this step to indicate that a read or write lock has been acquired. At step 108, the resource request is accessed based upon the analyzed lock state information. Step 110 releases the lock, and the lock state information may be updated to indicate that a read or write lock has been released. Processing for this iteration ends at end block 112.

Figure 5:
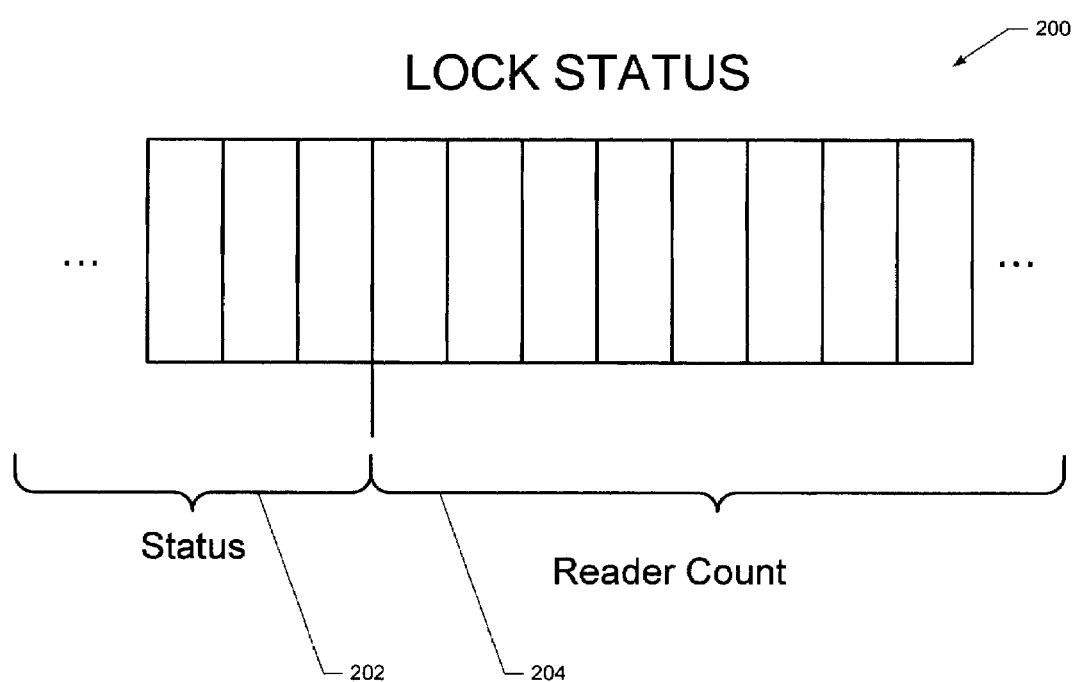
FIGS. 5 and 6 are bit data store diagrams depicting locking mechanisms.

FIG. 5 depicts at 200 an example of a lock status data store that could be used. The lock status data store 200 of FIG. 5 uses two classes of bits within the lock status: status bits 202 and bits 204 which form an integer subset containing the count of reader requests that have been granted and that need to be processed. In this example, the encapsulation of the locking state information as a single unit allows atomic hardware operations to quickly determine correct processing of the access request for the lock. It is noted that the term "atomic operation" is generally considered to be an operation which is allowed to start and finish without being interrupted.

Figure 6:
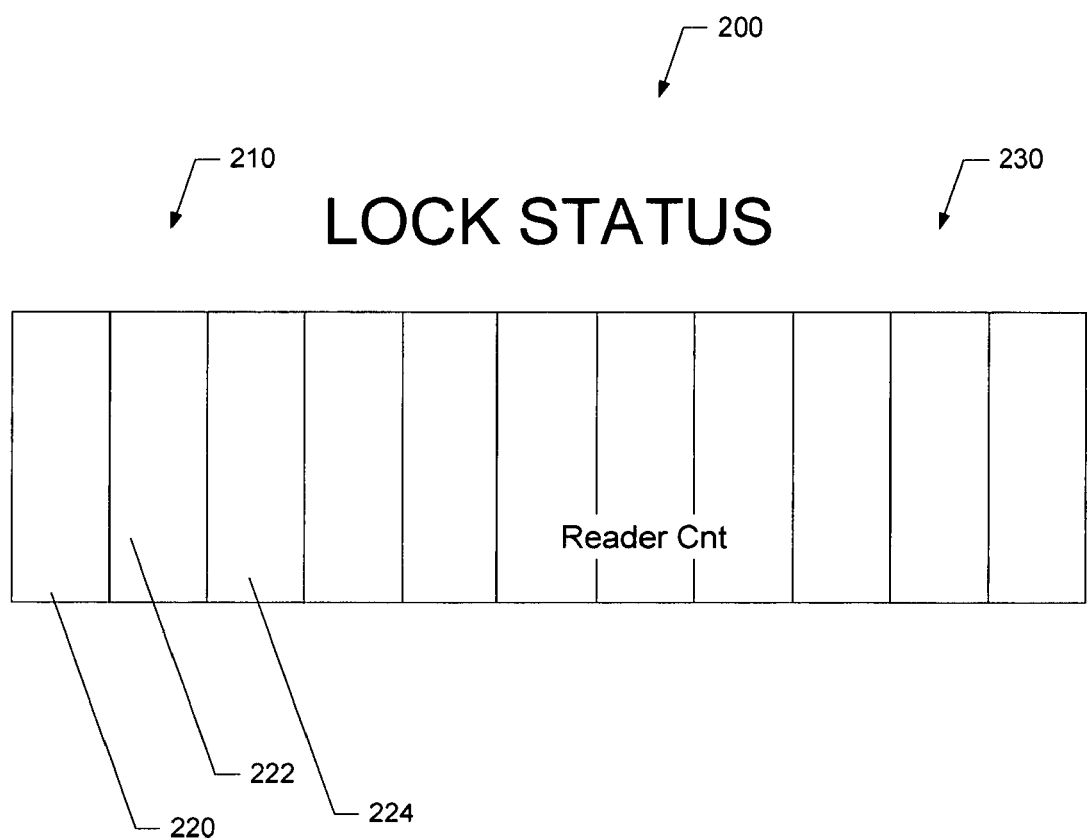

A lock status data store 200 may use as many bits as desired to capture the locking state of the system. For example, FIG. 6 depicts a lock status data store 200 which uses three bits (220, 222, 224) as status bits 210 which are available for atomic access. The status bits 210 offer multi-threaded protection via a quick determination of a processing path to be used in place of an operating system (OS) mutex.

In the example shown in FIG. 6, the write pending/requested bit 220 is set only when a write request has been made. This provides an expedient method for determination of whether the slower OS mutex lock is required. Because most shared lock's requests are typically for read requests, performance is improved whenever the more computationally involved OS mutex can be avoided. The lock status data store 200 allows an operating system to avoid the OS mutex approach (e.g., avoiding the OS mutex approach only when no writer is pending). Correspondingly, the lock status data store 200 can indicate that in some situations the OS mutex lock is to be used, such as when a writer request is pending or active.

In the lock status data store 200, the writer active bit 222 is set to indicate that a writer thread is currently active. This provides protection against reader threads posting an OS event after the writer thread has been activated. It is noted that an OS event is a signaling mechanism to notify one or more threads of an occurrence of a particular event (e.g., notification that a lock has been released).

The wait event posted bit 224 is set to indicate that a write request waits on a wait event to be posted before proceeding. The last active read operation will clear this bit prior to posting an event to ensure that one and only one post will occur; this posting will occur if the writer active bit is not set.

The remaining low order bits 230 are used for an active reader count in a normal 2's complement fashion. By tracking the reader count, the system knows whether readers are present and when the last reader exits. Any number of bits may be used for the reader count. In a 32 bit atomic integer, 29-bits are available for read requests, which allow for up to 536,870,912 read lock requests. It should be understood that the order of the bits provided in FIG. 6 serves as an example of a lock data structure and that the order of the bits may be altered in different ways while still achieving a safe, shared and mutually exclusive desired lock status data structure.

It is noted that many techniques may be used with the lock status data store 200, such as implementing shared access locks using basic OS primitives for those OS implementations not having native shared locks. For those that do, use of a lock status data store 200 can show increased performance over the native implementation by, among other things, using hardware atomic operations on a single status atomic integer in place of a slower OS mutex locking of a status data structure.

In this example, the shared lock may include the following elements encapsulated in a structure forming the basis of a shared lock: a native OS lock, a native OS event, and a host specific entity allowing for atomic integer operations which maintains the lock status. The host specific atomic entity may be an integer, or two integers where one serves as a barrier to modification of the other (to allow for machine level instruction spin-lock implementations).

The implementation may utilize host-level atomic routines for manipulation of the atomic entity, such as: an atomic get operation, which returns the current integer value of the atomic entity (on most hosts this may be the value integer portion of the atomic entity); an atomic set operation, which attempts to perform a compare/exchange operation on the atomic, and allows for indication of success or failure of the operation; an atomic add operation, which adds a value to the current atomic entity value and returns the new value;

and an atomic sub operation which is typically an atomic add operation with the addend being the negative of the input to the atomic sub operation.

Figure 7:
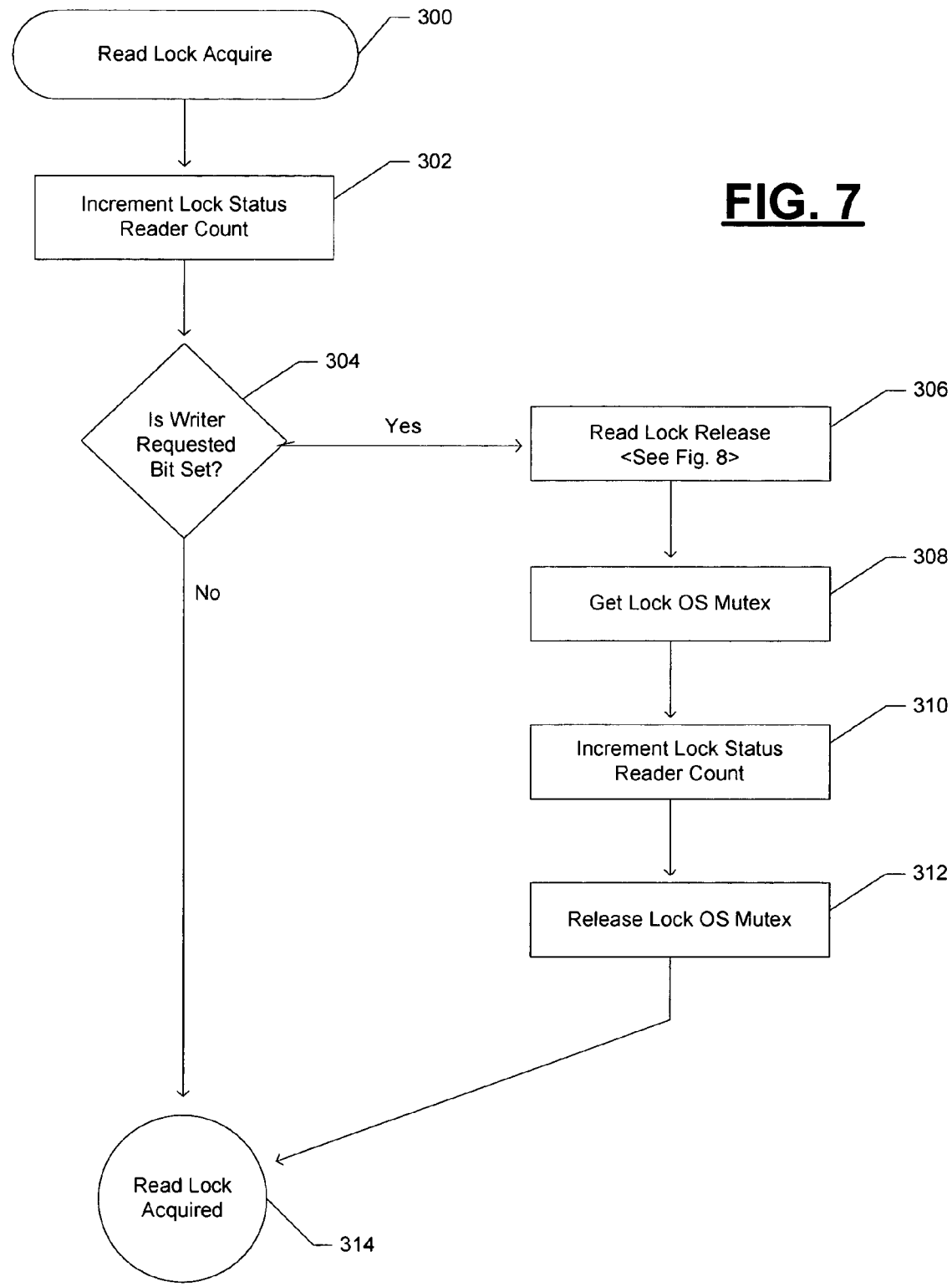
FIG. 7 is a flow chart depicting a read lock acquisition example.

FIG. 7 is a flow chart depicting a read lock acquisition example 300. Due to the fact that shared locks are primarily used in read lock mode, the implementation in this example is designed to favor read requests as shown in step 302 with an initial increment of the lock status. If the lock status value shows that there is no writer request pending (or active) as determined at decision step 304, then the read request is said to have succeeded as shown at indicator 314.

If there is a pending or active write request as determined by decision step 304, the read request unregisters its lock status that was made in step 302. In other words, the process backs out of the increment. This is done at step 306 by following the procedure described in reference to FIG. 8 below. Following the read lock release, the read request waits on the lock OS mutex in step 308. After acquiring the lock OS mutex, the lock status can safely be incremented in step 310. The lock OS mutex is then released at step 312, and the read lock request is now satisfied as shown at indicator 314.

Figure 8:
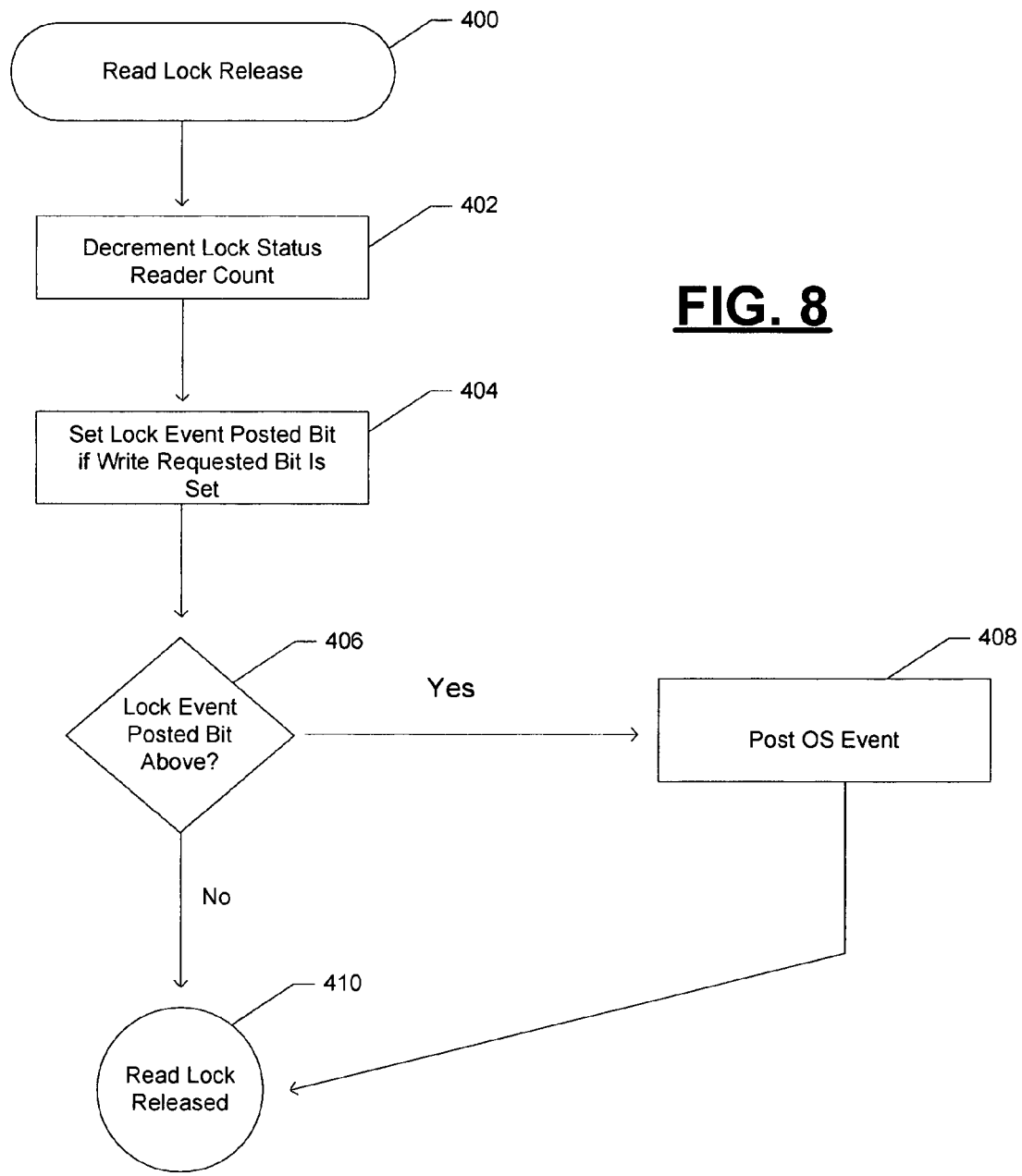
FIG. 8 is a flow chart depicting a read lock release example.

FIG. 8 is a flow chart depicting a read lock release example 400. First the lock status is decremented at step 402. An attempt is made at step 404 to set the event post bit of the lock status. This may be done using an atomic set operation with an expected value such that the value will be set only when a write request is pending and not active, and the read request count is zero. If this value is indeed set at step 404 as determined by decision block 406, then an OS event is posted at step 408 to ensure that a waiting writer is allowed to run. After posting the OS event at step 408, or if the atomic set operation failed at step 404, then the read request is deemed successful as shown at indicator 410. It is noted that setting the lock event posted bit at step 404 may have failed because another read request had previously posted the event. Setting of the lock event posted bit ensures protection against multiple posts of the OS event and against the writer being active.

Figure 9:
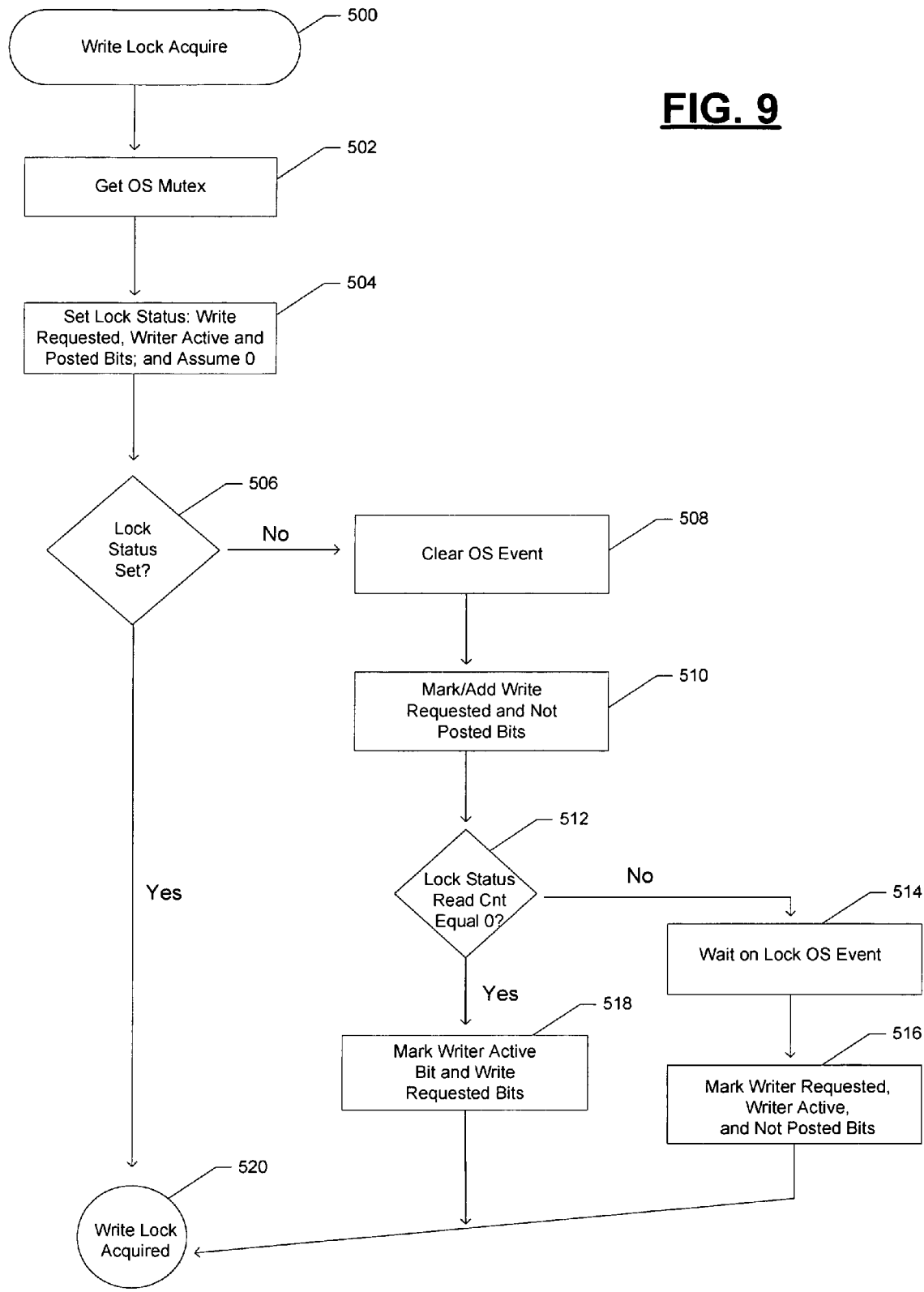
FIG. 9 is a flow chart depicting a write lock acquisition example.

FIG. 9 is a flow chart depicting a write lock acquisition example 500. First, the writer attempts to acquire a lock OS mutex at step 502. This provides that there is only one active writer at any given time and thus protects a writer from other writers. An attempt is made to set the lock status for both writer pending, writer active and not-posted bits at step 504. If the lock status was set as determined by decision step 506, then the write lock has been acquired as shown by indicator 520.

However if the lock status was not set as determined by decision step 506, then this indicates that the read count is non-zero (i.e., readers are present), and the lock OS wait event is cleared at step 508 in preparation for a possible wait for an event that indicates that the writer can proceed. The OS event may be associated with the threads themselves instead of the lock data structure. However, there may be certain situations wherein an OS event may be associated with the lock status. It should be understood that based upon the situation at hand an OS event may be associated with the lock data structure.

The write pending (i.e., write requested) and not-posted bits are set at step 510, such as by using an atomic add operation. The lock status reader count is again checked at step 512, and if the reader count is zero, the write request is safe to honor, and step 518 marks the writer active bit of the lock status. After step 518 finishes, the write lock is deemed acquired as shown at indicator 520.

If decision step 512 determines that the lock status read count is not equal to zero, then read requests are still outstanding, and the write request waits at stop 514 for a lock OS event. It is noted that waiting on the lock OS event at step 514 (on FIG. 9) may end when a read request posts the OS event at step 408 (on FIG. 8).

After step 514, the writer active and not-posted bits are set in the lock status at step 516. The not-posted bit is set as an indicator that the lock OS event should not be waited upon when the write lock release occurs. After step 516 finishes, the write lock is deemed acquired as shown at indicator 520.

Figure 10:
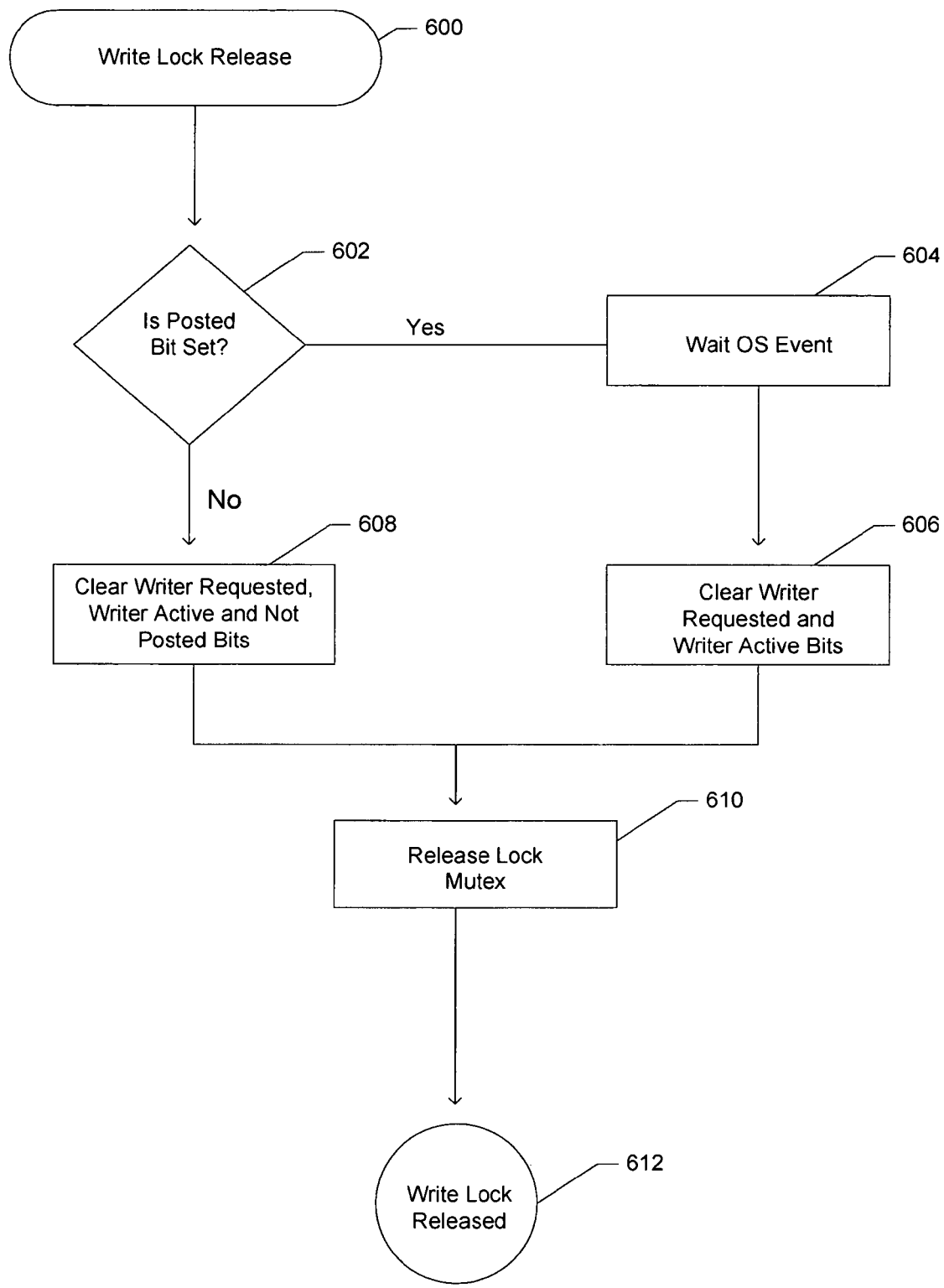
FIG. 10 is a flow chart depicting a write lock release example.

FIG. 10 is a flow chart depicting a write lock release example 600. At step 602, a check of the lock status for the not-posted flag is performed. If the not-posted flag is set, then the lock OS event is waited for at step 604. This ensures that the read request that has knowledge of the OS event is given the chance to post it. This also protects against a read request (knowing of the OS event to post) being preempted prior to posting, and returning to post an OS event that is setup for a different future pending write request. The remaining active bits are cleared at either steps 606 or 608 depending upon the branching that occurred at decision step 602. Step 606 involves the clearing of two bits (i.e., the writer and active bits) in the lock status, whereas step 608 involves the clearing of three bits (i.e., the writer, active and not-posted bits). This ensures that all of the bits in the write requested and writer active positions are cleared before the OS mutex is released. After the bits have been cleared, the lock OS mutex can be safely released at step 610, and the write lock is released as shown at indicator 612.

It is noted that the flow charts discussed herein may have more or less steps than what are disclosed herein in order to suit the situation at hand. For example in FIGS. 7 and 10, the processing may have a slight read lock acquisition bias, in that after the lock status has its write pending bit cleared (e.g., in steps 606 or 608) a new read lock acquisition request at step 304 can proceed ahead of all pending requests (e.g., steps 308, 502). This should be acceptable in most situations as most shared lock implementations already have a read bias, whereas later reads can progress ahead of pending write requests. However, it should be understood that the processing may also, if the situation arises, be modified to have a write lock acquisition bias. It should be further understood that even if a bias is used (whether it is a reader or writer bias), fairness is achieved—e.g., a starvation situation or a deadlock situation does not occur due to use of the lock status data structure.

Figure 11:
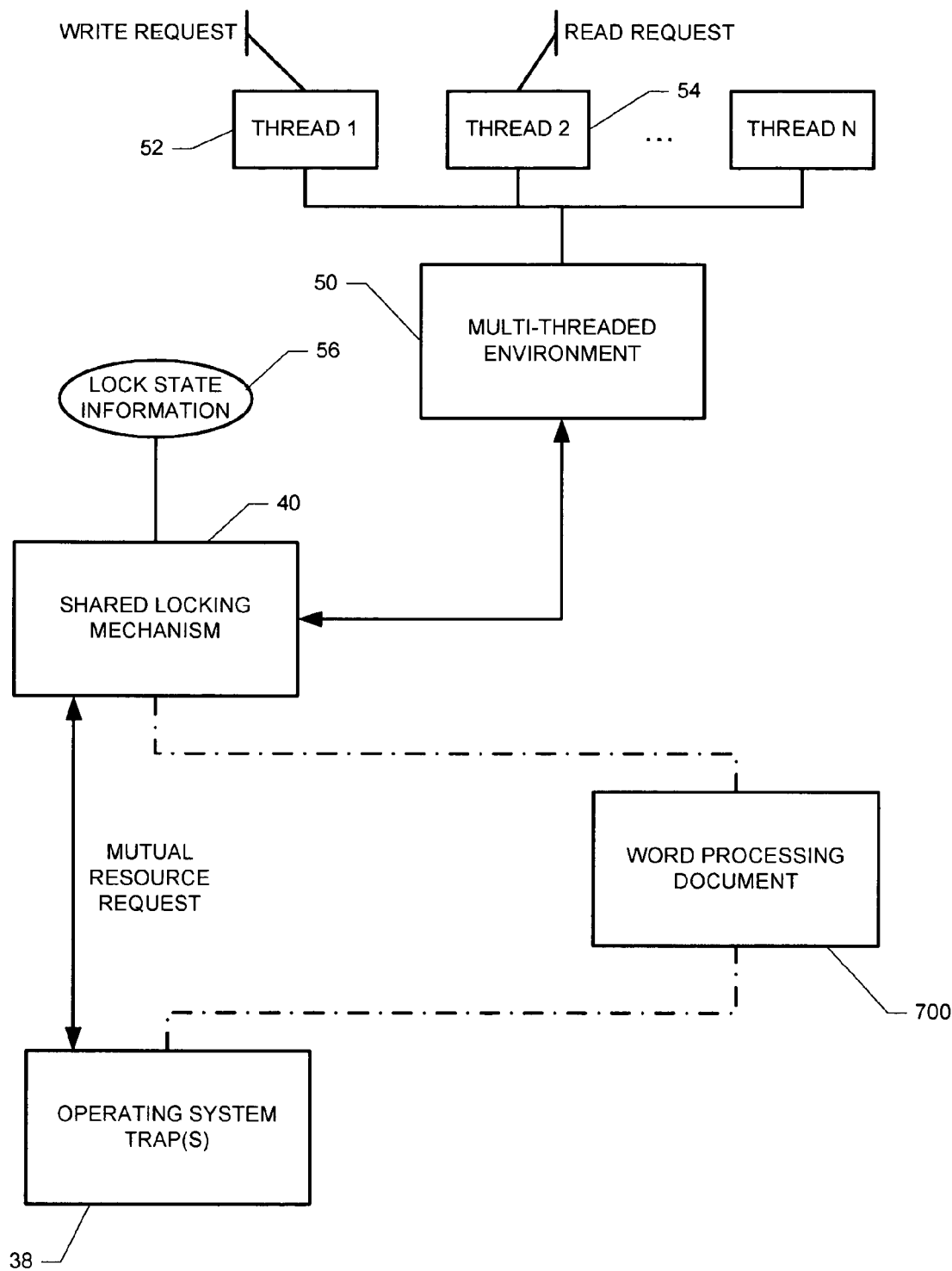
FIGS. 11 and 12 are block diagrams depicting example applications utilizing a locking mechanism.
Figure 12:
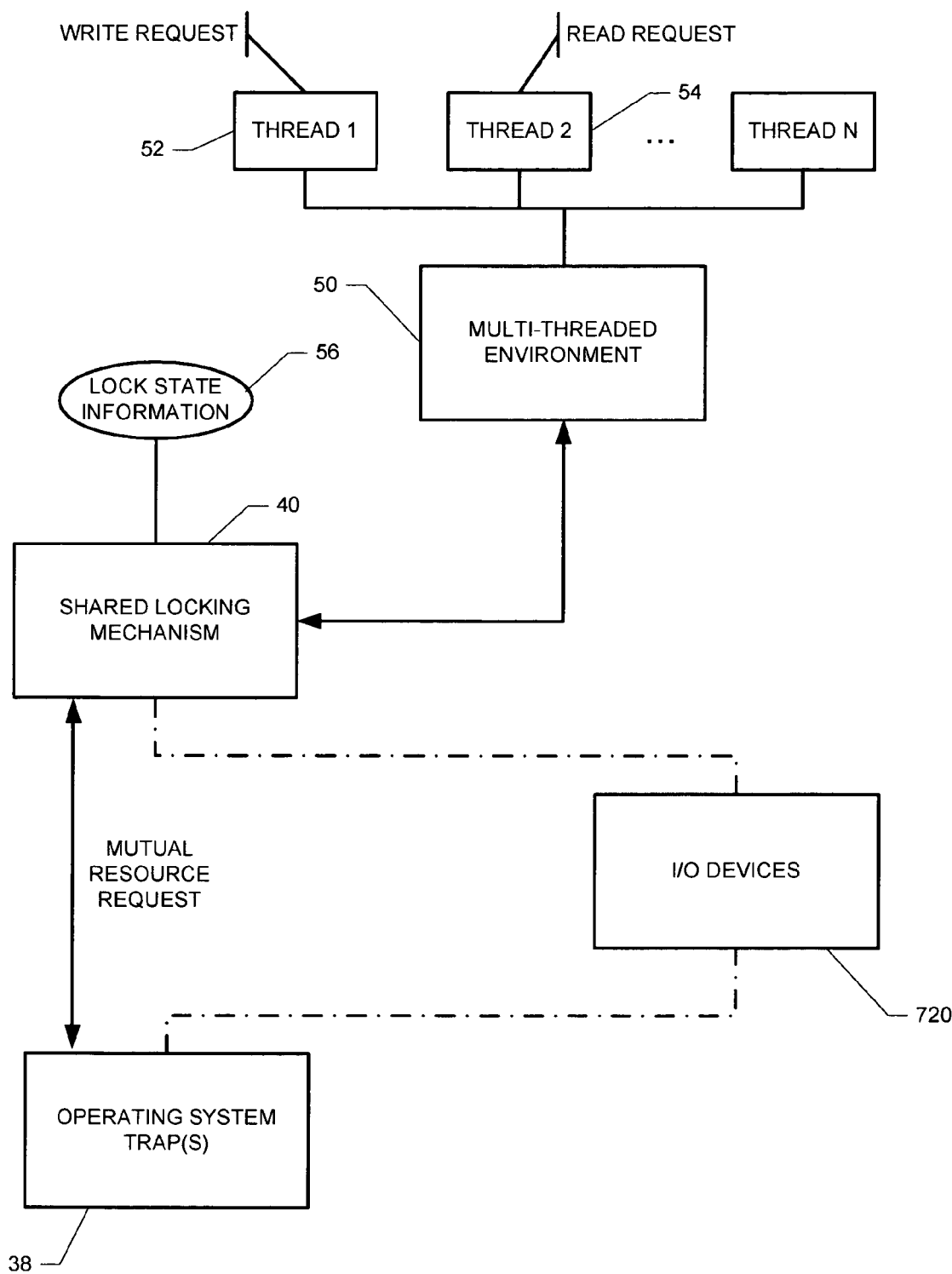

FIGS. 11 and 12 are block diagrams depicting some of the wide ranges of resources to which a locking system may be directed. FIG. 11 illustrates a shared locking mechanism 40 being used to coordinate access to a word processing document 700. In this example, multiple users wish to read the word processing document 700 while one or more users wish to update the document 700. The shared locking mechanism 40 guides based upon the teachings disclosed herein how access to the word processing document 700 occurs for each of these requests.

While a single resource is shown in FIG. 11, it should be understood that a shared locking mechanism 40 may be used with multiple resources, such as shown in FIG. 12. FIG. 12 illustrates the shared locking mechanism 40 being used to coordinate access to multiple input/output (I/O) devices 720. Still further, many other types of resources can be managed by the shared lacking mechanism 40, such as memory locations, queues, etc.

While examples have been used to disclose the invention, including the best mode, and also to enable any person skilled in the art to make and use the invention, the patentable scope of the invention is defined by the claims, and may include other examples that occur to those skilled in the art. As an illustration, although the flow charts of FIGS. 7-10 discuss the explicit lock case for both read and write requests, the processing may be expanded to include other cases, such as the 'try' lock case. This may include, but is not limited to, returning a LOCK_BUSY code when the lock cannot be immediately obtained.

As yet another example of the many applications and extensions of the system, FIG. 13 depicts that a software module 800 may act as an interface between the shared locking mechanism 40 and the software mechanisms 40 and 60, as well as between the shared locking mechanism 40 and OS trap(s) 38. This may help to hide implementation details involving the shared locking mechanism 40, rules mechanism 60, and the OS trap(s) 38.

It is noted that processes and/or threads that wish to access the resources may enter any number of states while waiting to access a resource. They may enter a hibernation/sleep state or if allowed, may continue executing until the resource becomes available. Still further, they may execute a spin loop and continue to request access to the resource until it is released.

It is further noted that the systems and methods disclosed herein may be implemented on various types of computer architectures, such as for example on a single general purpose computer or workstation, or on a network (e.g., local area network, wide area network, or internet), or in a client-server configuration, or in an application service provider configuration. As an illustration, the requesting processes may all reside locally on the same computer as the shared locking mechanism, or may be distributed on remote computers, or may reside both on a local computer as well as on one or more remote computers. As another example of the wide scope, different OS atomic operations may be utilized with the systems and methods, and the OS atomic operations may dictate the implementation of the lock status data structure (e.g., for some hosts the atomic nature of tracking requests in the lock status data structure may be implemented by a load/clear approach; in a load/clear architecture, the tracking of read/write status may be handled by a separate locking integer protecting the actual status information. Note: This architecture would not require 'backing out changes' as was shown in FIG. 8.)

The systems' and methods' data may be stored as one or more data structures in computer memory depending upon the application at hand. The systems and methods may be provided on many different types of computer readable media including instructions being executable by a computer to perform the system and method operations described herein.

The computer components, software modules, functions and data structures described herein may be connected directly or indirectly to each other in order to allow the flow of data needed for their operations. It is also noted that a software module may include but is not limited to being implemented as one or more sub-modules which may be located on the same or different computer. A module may be a unit of code that performs a software operation, and can be implemented for example as a subroutine unit of code, or as a software function unit of code, or as an object (as in an object-oriented paradigm), or as an applet, or as another type of computer code.

It should be understood that as used in the description herein and throughout the claims that follow, the meaning of "a," "an," and "the" includes plural reference unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed as the invention:

1. A memory for storing a computer-implemented shared locking data store for handling multiple executable entities' access to at least one resource, said shared locking data store being stored in a computer memory, said shared locking data store comprising:

write requested data that is indicative of when a write request for the resource has been made;

writer active data that is indicative of whether a writer process is actively undergoing a write operation with respect to the resource;

wait event posted data, wherein the wait event posted data is indicative of whether a read request to the resource has completed, wherein the wait event posted data is used to indicate when a write request can access the resource;

reader data that is indicative of whether a reader process is active and attempting to read from the resource;

wherein the shared locking data store allows writer and reader locking state information to be determined so that access to the resource can be handled;

wherein encapsulation of both lock status data and the reader data in the shared locking data store allows a hardware atomic operation to operate upon both the lock status data and the reader data as a single unit for determining how access to the resource is to be handled;

wherein the multiple executable entities' access is a concurrent access to the at least one resource;

wherein a set status for the write requested data indicates whether an operating system (OS) mutex lock is to be used for processing access to the resource and is used to avoid an OS mutex lock when no writer process is pending.

2. The memory for storing the shared locking data store of claim 1, wherein the executable entities include processes, threads, daemons, applets, servlets, ActiveX components, stand-alone applications, code that runs at the request of another program, or combinations thereof;

wherein use of the shared locking data stores allows for the avoidance of an operating system call or avoidance of a resource accessing trap of the operating system's kernel.

3. The memory for storing the shared locking data store of claim 1, wherein the multiple executable entities include threads which are to access the resource, wherein the threads comprise a writer thread and a reader thread, wherein the locking state information is used to determine how the writer thread and the reader thread access the resource.

4. The memory for storing the shared locking data store of claim 3, wherein the resource requires protection on a per thread basis.

5. The memory for storing the shared locking data store of claim 3, wherein the locking state information indicates where in the overall locking process an operating system is with respect to the resource.

6. The memory for storing the shared locking data store of claim 3, wherein the request of the reader thread is allowed to succeed unless there is a write request active or pending as indicated by the write requested data and the writer active data.

7. The memory for storing the shared locking data store of claim 3 further comprising:

rules mechanism that indicates how resource access requests are to be handled based upon the data stored in the shared locking data store.

8. The memory for storing the shared locking data store of claim 7, wherein the rules mechanism includes allowing any number of read requests to succeed unless there is a writer active or pending as indicated by the shared locking data store.

9. The memory for storing the shared locking data store of claim 8, wherein the rules mechanism includes allowing only one writer to be active at any given time.

10. The memory for storing the shared locking data store of claim 9, wherein the rules mechanism includes that no preference is given when deciding which of waiting read or write requests should be honored first.

11. The memory for storing the shared locking data store of claim 10, wherein the rules mechanism substantially eliminates a reader request starvation or a writer request starvation situation with respect to the resource.

12. The memory for storing the shared locking data store of claim 1, wherein the resource comprises data stored in computer memory.

13. The memory for storing the shared locking data store of claim 1, wherein the resource comprises a computer file.

14. The memory for storing the shared locking data store of claim 1, wherein the resource comprises an input/output device.

15. The memory for storing the shared locking data store of claim 1, wherein the write requested data is to have a set status when a write request has been made.

16. The memory for storing the shared locking data store of claim 1, wherein the operating system returns a lock busy status indicator when a lock cannot be obtained within a predetermined time.

17. The memory for storing the shared locking data store of claim 1, wherein indication of whether a writer process is active by the writer active data is used to protect against readers posting an operating system (OS) event after the writer thread has been activated.

18. The memory for storing the shared locking data store of claim 1 further comprising wait event posted data, wherein the wait event posted data is indicative of whether a read request to the resource has completed, wherein the wait event posted data is used to indicate when a write request can access the resource, wherein a last active read clears status of the wait event posted data prior to posting an event.

19. The memory for storing the shared locking data store of claim 18, wherein the clearing ensures that one and only one posting to a writer of an event occurs.

20. The memory for storing the shared locking data store of claim 19, wherein the posting occurs if status of the writer active data is not set.

21. The memory for storing the shared locking data store of claim 18, wherein the processes comprise threads, wherein the wait event posted data indicates when events can be posted by one thread to notify another thread that the other thread's request can be processed.

22. The memory for storing the shared locking data store of claim 21, wherein the wait event posted data indicates whether a reader thread can post a lock release event to a writer thread.

23. The memory for storing the shared locking data store of claim 22, wherein the wait event posted data is used to prevent multiple reader threads from posting redundant lock release events.

24. The memory for storing the shared locking data store of claim 18, wherein the write requested data, writer active data, and wait event posted data provide multi-threaded protection in place of an operating system (OS) mutex.

25. The memory for storing the shared locking data store of claim 18, wherein locking state data comprises the write requested data, the writer active data, the reader count data, and the wait event posted data;
   wherein the locking state data is formatted as a single atomic unit.

26. The memory for storing the shared locking data store of claim 25, wherein the locking state data is formatted as a multi-bit single unit.

27. The memory for storing the shared locking data store of claim 26, wherein the formatting of the locking state data as a single unit allows an operating system to use atomic operations upon the locking state data.

28. The memory for storing the shared locking data store of claim 27, wherein the atomic operations include an atomic get operation.

29. The memory for storing the shared locking data store of claim 27, wherein the atomic operations include an atomic set operation.

30. The memory for storing the shared locking data store of claim 27, wherein the atomic operations include an atomic add operation.

31. The memory for storing the shared locking data store of claim 27, wherein the atomic operations include an atomic sub operation.

32. The memory for storing the shared locking data store of claim 25, wherein the locking state data is formatted as a multi-bit single unit;
   wherein the write requested data comprises a single bit in the unit;
   wherein the writer active data comprises a single bit in the unit;
   wherein the wait event posted data comprises a single bit in the unit;
   wherein the reader data comprises a plurality of bits in the unit to indicate number of active readers with respect to the resource.

33. The memory for storing the shared locking data store of claim 32, wherein the reader data comprises low order bits of the unit.

34. The memory for storing the shared locking data store of claim 33, wherein the reader data's count of the readers provides an indication as to whether readers are present and when the last reader exits.

35. The memory for storing the shared locking data store of claim 32, wherein a read lock acquisition means accesses the locking state data for processing a read lock acquisition of the resource.

36. The memory for storing the shared locking data store of claim 32, wherein a read lock release means accesses the locking state data for processing a read lock release of the resource.

37. The memory for storing the shared locking data store of claim 32, wherein a write lock acquisition means accesses the locking state data for processing a write lock acquisition of the resource.

38. The memory for storing the shared locking data store of claim 32, wherein a write lock release means accesses the locking state data for processing a write lock release of the resource.

39. The memory for storing the shared locking data store of claim 1, wherein the hardware atomic operation includes machine level instructions for performing an operation on the shared locking data store for handling access to the resource;
   wherein the reader data includes reader count data;
   wherein the encapsulation of both the lock status data and the reader count data in the shared locking data store include encapsulation of status bits and bits which form an integer subset containing the count of reader requests that have been granted and that need to be processed;

wherein the status bits include a write pending-requested indicator that is set when a write request has been made in order to determine whether an OS mutex lock is required.

40. A computer-implemented method for handling multiple executable entities' access to at least one resource, comprising:

receiving a request from an executable entity to access a resource;

determining how to process the resource request based upon lock state data;

wherein lock state data comprises write requested data and reader data;

wherein the write requested data is indicative of when a write request for the resource has been made with respect to the resource;

wherein if the write requested data indicates that a write request has not been made for the resource, then providing access to the resource such that an operating system (OS) mutex is avoided for a read lock acquisition;

wherein the reader data is indicative of whether a reader executable entity is active and attempting to read from the resource;

wherein encapsulation of both lock status data and the reader data in the shared locking data store allows a hardware atomic operation to operate upon both the lock status data and the reader data as a single unit for determining how access to the at least one resource is to be handled;

wherein the multiple executable entities' access is a concurrent access to the at least one resource;

wherein a set status for the write reauested data indicates whether an operating system (OS) mutex lock is to be used for processing access to the resource and is used to avoid an OS mutex lock when no writer process is pending.

41. A computer-implemented apparatus for handling multiple executable entities' access to at least one resource, comprising:

means for receiving a request from an executable entity to access a resource;

means for determining how to process the resource request based upon lock state data;

wherein lock state data comprises write requested data and reader data, wherein the write requested data is indicative of when a write request for resource has been made with respect to the resource;

wherein if the write requested data indicates that a write request has not been made, then providing access to the resource such that an operating system (OS) mutex is avoided for a read lock acquisition;

wherein the reader data is indicative of whether a reader executable enity is active and attempting to read from the resource;

wherein encapsulation of both lock status data and the reader data in the shared locking data store allows a hardware atomic operation to operate upon both the lock status data and the reader data as a single unit for determining how access to the at least one resource is to be handled;

wherein the multiple executable entities' access is a concurrent access to the at least one resouce;

wherein a set status for the write requested data indicates whether an operating system (OS) mutex lock is to be used for processing access to the resource and is used to avoid an OS mutex lock when no writer process is pending.

42. The apparatus of claim 41 further comprising:

read lock acquisition means for accessing the lock state data in order to process a read lock acquisition of the resource;

read lock release means for accessing the lock state data in order to process a read lock release of the resource;

write lock acquisition means for accessing the lock state data in order to process a write lock acquisition of the resource;

write lock release means for accessing the lock state data in order to process a write lock release of the resource.

43. A machine-readable medium or media storing software instructions for handling multiple executable entities' access to at least one resource, said software instructions, when executed by a machine, cause the machine to:

receiving a request from an executable entity to access a resource;

determining how to process the resource request based upon lock state data;

wherein lock state data comprises write requested data and reader data;

wherein the write requested data is indicative of when a write request for the resource has been made with respect to the resource;

wherein if the write requested data indicates that a write request has not been made for the resource, then providing access to the resource such that an operating system (OS) mutex is avoided for a read lock acquisition;

wherein the reader data is indicative of whether a reader executable entity is active and attempting to read from the resource;

wherein encapsulation of both lock status data and the reader data in the shared locking data store allows a hardware atomic operation to operate upon both the lock status data and the reader data as a single unit for determining how access to the at least one resource is to be handled wherein the multiple executable entities' access is a concurrent access to the at least one resource;

wherein a set status for the write requested data indicates whether an operating system (OS) mutex lock is to be used for processing access to the resource and is used to avoid an OS mutex lock when no writer process is pending.

* * * * *

UNITED STATES PATENT AND TRADEMARK OFFICE
CERTIFICATE OF CORRECTION

PATENT NO. : 7,380,073 B2 Page 1 of 1
APPLICATION NO. : 10/722761
DATED : May 27, 2008
INVENTOR(S) : Shorb It is certified that error appears in the above-identified patent and that said Letters Patent is hereby corrected as shown below:

In column 11, line 36, delete "reauested" and insert -- requested --.

Signed and Sealed this

Twelfth Day of August, 2008

JON W. DUDAS
*Director of the United States Patent and Trademark Office*